July 12, 1960
J. PICKLES
2,944,437
METHOD OF MAKING FEED SCREW STOP
Filed July 14, 1958
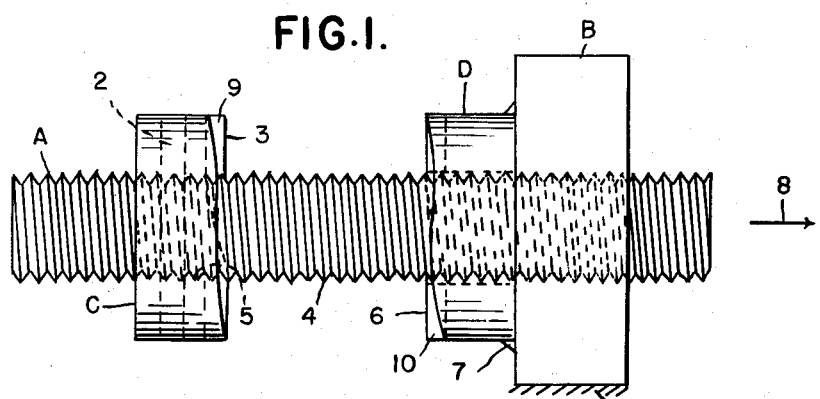
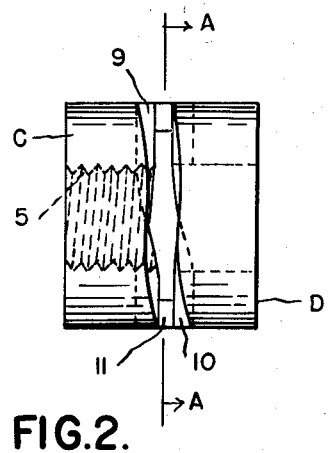
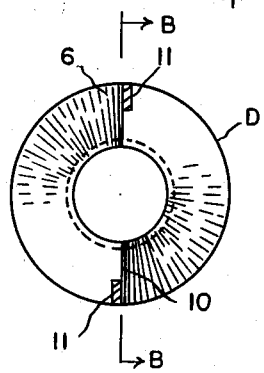
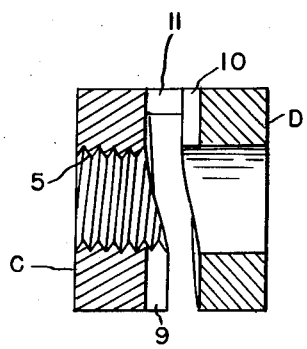
INVENTOR.
JOSEPH PICKLES
BY Whittemore Hulbert & Belknap
ATTORNEYS

United States Patent Office 2,944,437
Patented July 12, 1960

2,944,437

METHOD OF MAKING FEED SCREW STOP

Joseph Pickles, Dearborn, Mich., assignor to Ferro Stamping Company, Detroit, Mich., a corporation of Michigan Filed July 14, 1958, Ser. No. 748,479

5 Claims. (Cl. 74—424.8)

The present invention relates generally to stops for a non-jamming feed screw and feed screw nut and refers more particularly to the alignment of these stops prior to their connection to a feed screw and its associated nut.

A non-jamming feed screw and nut combination is disclosed in my copending application filed January 10, 1958, having Serial Number 710,132. One method of providing a non-jamming feed screw and nut combination is to include stops for attachment to the feed screw and nut which will limit the relative axial movement of the screw and nut before they reach a jamming position. It is of course necessary that the stops provided do not themselves frictionally interlock or jam. The stops must therefore be aligned when attached to the feed screw and its associated nut so that the contacting surfaces of the stops abut cleanly without frictional interlock or jamming.

One of the essential objects of my invention is therefore to provide means for the initial alignment of stops which are to be installed on feed screws and feed screw nuts.

Another object is to provide stops for installation on a feed screw and its associated nut which stops include means integral therewith for aligning the stops during their installation.

Another object is to provide means for initially aligning stops which are to be installed on feed screws and their associated nuts which means is easily removable after the initial installation of the stops.

Another object is to provide a method for aligning stops for feed screws and feed screw nuts during the initial installation of the stops on the screw and nut.

Another object is to provide means for initially aligning stops on feed screws and their associated nuts which is simple, economical, and efficient.

Other objects, advantages and novel details of construction of this invention will be made more apparent as this description proceeds, especially when considered in connection with the accompanying drawings wherein:

Figure 1 is a feed screw and a feed screw nut shown with a pair of stops attached thereto according to this invention.

Figure 2 is a pair of stops like those of Figure 1 but before the installation thereof on a feed screw and nut.

Figure 3 is a cross section through the stops of Figure 2 taken on the line A—A of Figure 2.

Figure 4 is a longitudinal section through the stops of Figure 2 taken on the line B—B of Figure 3.

In accordance with the present invention a pair of annular members adapted to be attached to a feed screw and feed screw nut respectively are provided with abutments on opposing surfaces. If the annular members are properly aligned when they are installed the abutments will make contact without jamming when the feed screw and its associated nut reach a limiting position. To insure that the annular members are properly aligned when they are installed the members are provided with means connecting them together in the required alignment before they are attached to the feed screw and nuts. They are then attached to the feed screw and nut while still held in alignment. After the installation of the annular members on the feed screw and nut the connection between the annular members is broken allowing free movement between the feed screw and feed screw nut.

In the drawings, a feed screw A and screw nut B are provided respectively with annular members C and D serving as stops for limiting the relative axial movement of the feed screw and feed screw nut.

In Figure 1 the feed screw A is shown engaged with the feed screw nut B. In operation, either the feed screw nut or the feed screw must be fixed so that it may not move axially with respect to the other member. The feed screw nut B is therefore indicated at 1 as being fixed against axial movement with respect to the feed screw A. In a feed screw and nut combination it is also necessary that either the screw or its associated nut be fixed against rotation relative to the other member of the combination. It is also indicated at 1 therefore that the feed screw nut B is fixed against rotation relative to the screw A. In operation, with the nut B fixed against rotation and axial movement the feed screw A will move axially with respect to the nut B when the screw is rotated. As shown in Figure 1 this axial movement of the screw A in the direction indicated by the arrow 8 will be limited by stops C and D. Stops C and D are provided to prevent jamming or frictional interlocking of nut B and screw A when screw A has reached a limiting position in the direction shown by arrow 8.

Stop C is shown in Figure 1 attached to the screw A by means of a pin 2. In the embodiment of the invention shown stop C is an annular member which is substantially flat on one side and which has a plurality of abutments 3 on the other side. The abutments 3 have a depth in the direction of axial movement of the screw A which is substantially equal to the lead of the threads 4 on screw A. Threads 5 are provided on stop C, as shown best in Figure 4, to facilitate the installation of stop C on screw A. The stop C may be of metal, plastic or other suitable material.

Stop D is also an annular member in the embodiment of the invention shown. It is provided with abutments 6 on one side and is substantially flat on the other side. The abutments 6 also have a depth equal to the lead of the threads 4 on screw A. Stop D is not provided with threads 5 or a pin 2 as is stop C, but is adapted to be attached to nut D by welding or other appropriate method as shown at 7.

Since stop C is attached to screw A by pin 2, the stop will move axially with screw B when screw B is rotated and will rotate in the same direction as screw B. With the screw A and nut B so designed that a clockwise rotation of screw A moves the screw A and the stop C in the direction of arrow 8, the stop C will approach stop D and abutments 3 of stop C will eventually make contact with abutments 6 of stop D. Providing the stops C and D were properly aligned when they were attached to the feed screw A and nut B the abutments 3 and 6 will make contact on substantially the total surfaces 9 and 10 of abutments 3 and 6. This will limit the possible travel of the screw A and nut B without jamming occurring between the screw A and nut B or the stops C and D. If the stops C and D are improperly aligned when they are installed on the screw A and nut B they may become jammed on contact with each other and then create the problem they are intended to solve.

Therefore according to this invention it is set forth that the proper alignment of stops C and D in their installed position may be accomplished by connecting the stops C and D together in proper alignment before they are installed on the screw A and nut B, installing the stops on the screw and nut while they are connected in their proper alignment, and then removing the connection between C and D.

The stops shown in Figure 1 are indicated in Figure 2 before they are installed on the screw A and the nut B. The stops C and D indicated in Figure 2 are connected together by thin strips 11 of rigid material molded integrally with the stops C and D. The strips 11 hold the stops C and D in alignment with each other while they are being installed so that proper contact will be made by surfaces 9 and 10 when the feed screw operates after installation of stops C and D. The strips 11 may connect the stops C and D at any point and may be of greater or lesser number than that indicated in Figures 2 and 3. It is necessary only that the strips 11 hold the stops C and D in a predetermined alignment until after the stops are installed on screw A and nut B. Also, while the strips 11 are shown in Figure 2 to be integral with stops C and D and made from the same material as the stops, this is not necessary. The strips 11 or other connecting means may be applied to the stops to align them after the stops have been formed individually. The connecting means shown as strips 11 may be of any material which is easily removed from the stops C and D after they are installed on screw A and nut B.

The installation of the stops C and D on the screw A and nut B may be as follows: With the screw A withdrawn from the nut B, the stops C and D connected as in Figure 2 are positioned on screw A with the aid of threads 5 on stop C so that stop C is in the position desired for limiting the axial movement of screw A. A hole for pin 2 is then drilled through stop C and screw A. Pin 2 is put in place completing the installation of stop C. The screw A is then engaged with nut B and rotated until nut B makes contact with stop D. Stop D is then welded or otherwise attached to nut B completing the installation of stop D. The strips 11 or other connecting means between stops C and D holding them in correct alignment may then be removed. This will leave the stops C and D in such a relation that the relative axial movement of feed screw A and feed screw nut B is limited by contact of the surfaces 9 and 10 of stops C and D without jamming or frictional interlocking occurring.

It is of course appreciated that the terms align and alignment and like terms used herein refer to axial alignment, rotational alignment and relative spacing between the annular members described above.

The drawings and the foregoing specification constitute a description of the method for aligning a pair of stops on a feed screw and nut and the means for accomplishing the alignment in such full, clear, concise and exact terms as to enable any person skilled in the art to practice the invention, the scope of which is indicated by the appended claims.

What I claim as my invention is:

1. A device for attachment to a feed screw and its associated nut which will limit the relative axial travel thereof without jamming the device or the screw and nut, comprising a pair of annular members having generally radial abutment surfaces on opposing faces thereof engageable with each other on relative angular and axial movement of said members to limit relative circumferential movement therebetween without jamming said members, said members being adapted to be attached to a feed screw and a feed screw nut respectively, and rigid releasable tie means connecting said members to maintain them in correctly axially and angularly aligned position during their initial attachment to said screw and nut whereby on subsequent relative axial travel of said feed screw and nut said radial abutment surfaces will be caused to engage to limit said axial travel of said feed screw and nut without jamming said members or said feed screw and nut.

2. The device as claimed in claim 1 wherein said rigid releasable tie means are connecting strips integral with said annular members and capable of easy destruction after the original attachment of the members.

3. The device as claimed in claim 1 wherein said annular members and said tie means are integrally molded from a resinous compound.

4. A method of aligning a pair of non-jam stop members which are adapted to be attached respectively to a feed screw and its associated nut, said members having generally radial abutment surfaces engageable with each other to limit relative movement between the feed screw and nut, comprising connecting said members together in the axial and angular alignment necessary to provide engagement of only the radial abutment surfaces of said members on axial movement toward each other after attachment to said screw and nut, fixedly securing the members respectively to said screw and nut while maintaining the aforesaid alignment, and then disconnecting said members.

5. A device for attachment to a feed screw and its associated nut which will limit the relative axial travel thereof without jamming the device or the screw and nut, comprising a pair of annular members having generally radial abutment surfaces on opposing faces thereof engageable with each other on relative angular and axial movement of said members to limit relative circumferential movement therebetween without jamming said members, one of said members having interior threads whereby it may be attached to a feed screw, the other of said members having no threads thereon and being adapted to be attached to a feed screw nut, and rigid releasable tie means connecting said members to maintain them in predetermined axial alignment and spacing and predetermined angular alignment during their initial attachment to said screw and nut whereby on subsequent relative axial travel of said feed screw and nut said radial abutment surfaces will be caused to engage to limit said axial travel of said feed screw and nut without jamming said members or said feed screw and nut.

References Cited in the file of this patent

UNITED STATES PATENTS

| | | |
|---|---|---|
| 1,457,749 | Rast | June 5, 1923 |
| 1,937,473 | Geary et al. | Nov. 28, 1933 |
| 1,999,027 | Wilhjelm | Apr. 23, 1935 |
| 2,356,861 | Link | Aug. 29, 1944 |
| 2,394,812 | Seitz | Feb. 12, 1946 |
| 2,590,251 | Hoover | Mar. 25, 1952 |